R. HASTINGS.
DEVICE TO PREVENT PLANT POTS FROM TIPPING OVER.
APPLICATION FILED FEB. 4, 1919.

1,357,777.

Patented Nov. 2, 1920.
2 SHEETS—SHEET 1.

R. HASTINGS.
DEVICE TO PREVENT PLANT POTS FROM TIPPING OVER.
APPLICATION FILED FEB. 4, 1919.

1,357,777.

Patented Nov. 2, 1920.
2 SHEETS—SHEET 2.

Inventor:
Russell Hastings,
by Robt. P. Hains.
Attorney

UNITED STATES PATENT OFFICE.

RUSSELL HASTINGS, OF BROOKLINE, MASSACHUSETTS.

DEVICE TO PREVENT PLANT-POTS FROM TIPPING OVER.

1,357,777.  Specification of Letters Patent.  Patented Nov. 2, 1920.

Application filed February 4, 1919. Serial No. 274,973.

*To all whom it may concern:*

Be it known that I, RUSSELL HASTINGS, a citizen of the United States, residing at Brookline, county of Norfolk, and State of Massachusetts, have invented an Improvement in Devices to Prevent Plant-Pots from Tipping Over, of which the following description, in connection with the accompanying drawings, is a specification, like characters on the drawings representing like parts.

The invention to be hereinafter described relates to devices for preventing plant pots and other bodies from tipping over on their supports.

Flower pots and other bodies are frequently placed on shelves, railings, window sills and other places where they are liable to be tipped over accidentally, with consequent injury to the plants or to the pots or to things adjacent thereto.

The aim and purpose of the present invention, therefore, is to provide a simple, cheap and efficient device to connect plant pots and other bodies to their supports and prevent them from tipping over.

The character of the invention will be best understood by reference to the following description of one good form thereof shown in the accompanying drawings, wherein:—

Figure 1:
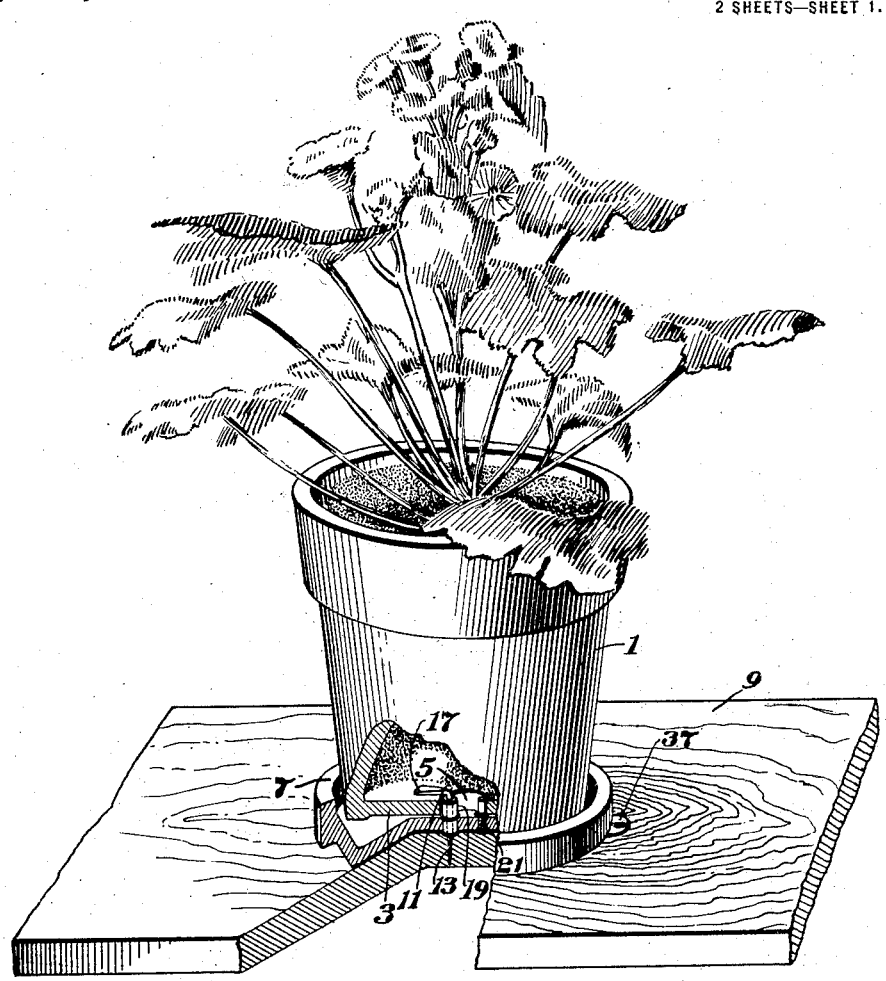
Figure 2:
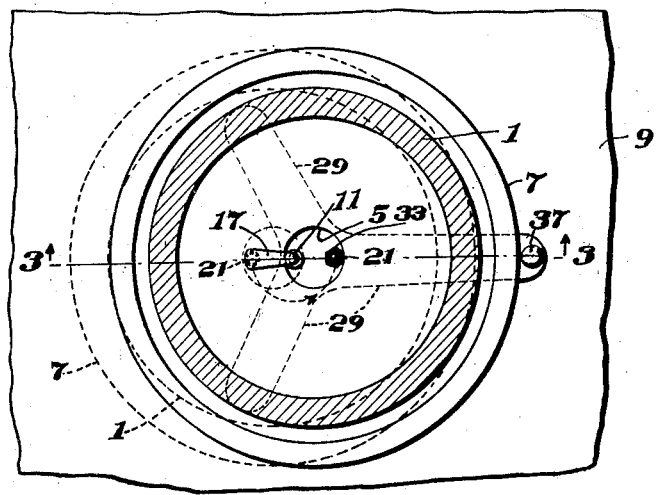
Figure 3:
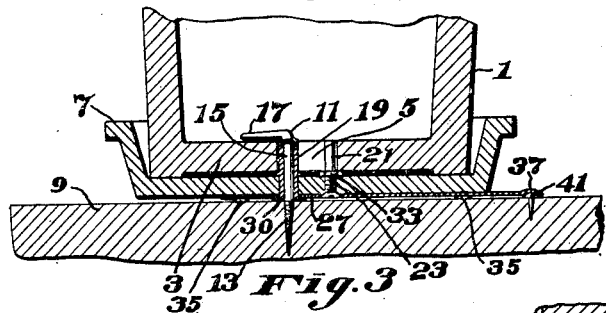

Figure 1 is a view of a plant pot and its saucer provided with a device embodying the invention to connect the same with the support therefor and prevent the pot from tipping over;

Fig. 2 on an enlarged scale is a horizontal section through the pot showing the relation of the pot and device when in different positions of relative adjustment;

Fig. 3 is a vertical section taken on line 3—3 of Fig. 2; and

Figures 4, 5:
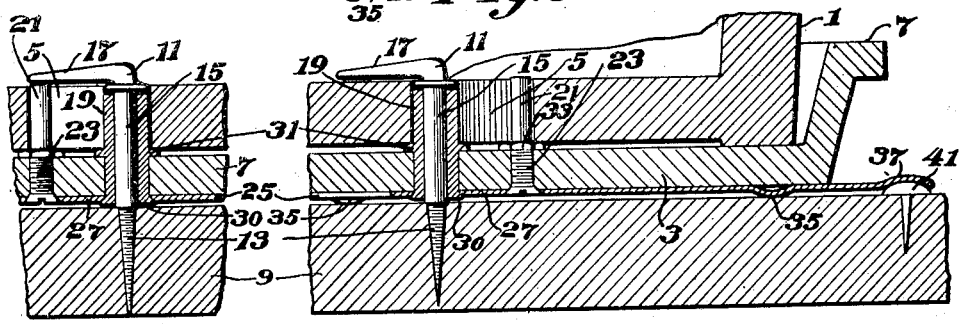

Figs. 4 and 5 on an enlarged scale are vertical sectional details of the locking device in releasing and locking relation to the pot respectively.

Referring to the drawings, 1 designates a plant pot having a base 3 with a drain hole 5 therefor, the pot being provided with a saucer 7 mounted on a support, in the present instance, in the form of a shelf 9.

The device for preventing the pot from tipping over, in the present instance of the invention, comprises an attaching member 11 having a threaded portion 13, a smooth shank 15, and a laterally projecting hook part or head 17. The threaded portion 13 is adapted to be screwed into the shelf or support to secure the attaching member in fixed relation with respect thereto. The smooth shank 15 is adapted to project through a sleeve or bushing 19 fast in a bore in the bottom of the saucer, and projecting preferably a substantial distance above the bottom to prevent leakage of water between said shank and bushing. The attaching member should be screwed into the support until the hook 17 is substantially on the level of the inner face of the base of the pot, as more fully hereinafter described. The hook of the attaching member should be of a length such that it may readily enter the drain hole in the bottom of the pot, as will be noted in Fig. 3.

Suitable means may be provided to maintain the pot in a position such that the attaching member will always be close to one side of the drain hole 5. To accomplish this, in the present instance of the invention, a pin or member 21 is provided having a shank 23 threaded into the bottom of the saucer, and a smooth portion projecting a substantial distance above the bottom for entrance into the drain hole of the pot at a point preferably diametrically opposed to the attaching member 11.

In use, the attaching member 11 and the pin 21 are applied to the bottom of the saucer with a spacing such that they may readily enter the drain hole and preferably are located on opposite sides of the center of the bottom of the saucer, and consequently are eccentric with respect to the saucer. Then the saucer is given a rotative adjustment about the axis of the attaching member to bring the upper end of the pin 21 at the end of the hook 17, as will be noted in Fig. 4 and in dotted lines in Fig. 2. Then the pot is placed in the saucer with the drain hole over the attaching member and the pin, so that when the pot is lowered to the bottom of the saucer, the attaching member and pin will project up into the drain opening. Then the pot and saucer are given a rotative adjustment about the axis of the attaching member, thereby moving the pin from its position shown in dotted lines in Fig. 2 to its position shown in full lines in said figure, and thereby moving the pot and saucer from their positions shown in dotted lines to their positions shown in full lines in Fig.

2. In the course of this adjustment, the drain opening will be moved from the position in registration with the hook 17 as shown in dotted lines in Fig. 2 to a position out of registration with said hook, as shown in full lines in Fig. 2. As a result, a portion of the base of the pot will be brought beneath the hook of the attaching member as indicated in Fig. 5, and the hook will be in a position to engage the inner face of the base of the pot, and thereby connect the pot and saucer with their support, and prevent the pot from tipping over.

In some instances it may be desirable to provide means to strengthen the connection of the attaching member and pin with the saucer. This means, in the present instance of the invention, comprises a spider plate 25 having a central portion 27 and radial legs 29 projecting toward the periphery of the saucer. The bushing 19 may be entered through a hole in the central portion of the spider, and the end 30 of the bushing may then be upset on the outer face of the central portion of the spider. The bushing may also have a collar 31 to engage the upper face of the bottom of the saucer. Thus, the upset end and the collar of the bushing will serve to confine the spider against the bottom of the saucer and securely hold the bushing in position. The pin 21 may also be entered through a hole in the central portion of the spider, and may have a nut 33 threaded thereon which will coöperate with the head of the pin further to confine the spider to the under face of the saucer and securely position the pin. The legs of the spider may have nubs 35 extruded therefrom to rest upon the supporting shelf and facilitate rotative adjustment of the saucer.

Suitable means may be provided to indicate the extent of rotative adjustments of the pot and saucer to bring the same into and out of locking relation with the hook 17. To accomplish this, in the present instance of the invention, one of the legs of the spider may be made sufficiently long to project beyond the saucer and present an end having a nub 37 extruded upwardly therefrom and adapted to engage the rounded head of a tack 41 in the support. This nub may readily slip over the head of the tack when it is desired to give the pot and saucer a rotative adjustment to release the same.

It will be noted that the pot may be rotatively adjusted about a vertical axis passing through the center of its drain hole without affecting the locking relation of the attaching member with the pot, and thus the pot may be readily positioned to present various sides of the plant to the light as desired.

While the device has been illustrated herein in its use in preventing plant pots from tipping over, it will be understood that it is not restricted thereto, but on the contrary it may be applied to various other containers and bodies.

It will be understood that the invention is not limited to the specific embodiment shown, and that various deviations may be made therefrom without departing from the spirit and scope of the appended claims.

What is claimed is:—

1. The combination with a plant pot and its saucer, of a device to hold the same to a support comprising an attaching member having a screw portion adapted to be threaded into the support, a shank to project through the saucer up through the usual drain hole in the base of the pot, and a hook at the upper end of said member; and a pin secured to said saucer having a portion to project up through said hole to hold said shank close to one side of said hole, said hook shank being located eccentrically of said saucer that the latter and the pot may turn on said shank to bring a portion of the inner face of the pot base beneath said hook.

2. The combination with a plant pot and its saucer, of a pair of pins adapted to project up from the saucer into the drain hole in the base of the pot at opposite sides of said hole, one of said pins having a portion projecting beneath said saucer for connection with a support and a head to overlie a part of the inner face of the pot base on rotative adjustment of said pot and saucer a predetermined amount about the axis of the pin for connection with the support.

3. The combination with a plant pot and its saucer, of a bushing and a pin secured to said saucer and adapted to project up into the drain hole in the base of the pot, and a member projecting through said bushing having a screw portion for connection with a support and a head to overlie a part of the inner face of the pot base on rotative adjustment of said pot and saucer about the axis of said member.

4. A device for preventing bodies from tipping over on their supports, comprising, a pair of members adapted for insertion into a base hole of a body, and a base plate connected to said members for application to the base of the body, one of said members having a part to lock with said body and provision for connecting the member with a support, that the base plate may be rotatively adjusted to produce interlocking relation between the body and said locking member.

5. A device for preventing bodies from tipping over on their supports, comprising, a locking member adapted for insertion into a base hole of the body and formed to lock with said body on relative rotative adjustment of said locking member and body, and means to indicate the extent of such adjustment.

6. In combination with a support and a body member having a base with a hole therein, means for securing said body member to said support, comprising a headed member secured to said support and positioned to project into said hole, and a pin projecting into said hole, said pin arranged to move said body member to bring a portion of the same adjacent said hole into locking engagement with said head.

7. In combination with a support and a body member having a base with a hole therein, means for securing said body member to said support, comprising a headed member secured to said support and positioned to project into said hole, and a pin projecting into said hole, said pin arranged to move said body member to bring a portion of the same adjacent said hole into locking engagement with said head, said pin arranged to retain said body member in locking engagement with said head irrespective of the rotation of said body member upon its support.

8. In combination with a support and a body member having a base with a hole therein, means for securing said body member to said support, comprising a member mounted upon said support to project into said hole and having a laterally projecting hook, and means engaging a wall formed by said hole to move said body member to a position in which said laterally projecting hook lockingly engages said base.

9. The combination with a plant pot having a base with a central drain hole therein, a support for said pot, and means for securing said pot to said support, comprising a pin projecting from said support into said central hole, said pin provided with a laterally projecting hook positioned to engage an inner face of said base adjacent said hole, and a second pin projecting into said hole and arranged to prevent said pot from being moved bodily sufficiently to disengage said hook from the inner face of said base.

10. The combination with a plant pot having a saucer, means for securing said pot to a support, comprising a pin secured to said support and projecting therefrom through an eccentric hole in said saucer into the central drain hole of said pot, said pin having a laterally projecting head upon the end thereof within said pot positioned to lockingly engage the inner face of said pot adjacent said hole, said head arranged to have said pot moved into locking engagement therewith by rotating said saucer above its eccentric, pin receiving opening.

In testimony whereof, I have signed my name to this specification.

RUSSELL HASTINGS.